(12) United States Patent
Awad et al.

(10) Patent No.: US 10,254,436 B2
(45) Date of Patent: Apr. 9, 2019

(54) SCANNING SYSTEM, METHOD, AND CORRESPONDING BRACKET

(71) Applicant: VOTI INC., Dorval (CA)

(72) Inventors: William Awad, Ile Bizard (CA); Simon Archambault, St-Hubert (CA)

(73) Assignee: VOTI INC., Dorval, Quebec (CA)

( * ) Notice: Subject to any disclaimer, the term of this patent is extended or adjusted under 35 U.S.C. 154(b) by 402 days.

(21) Appl. No.: 15/026,823

(22) PCT Filed: Oct. 1, 2013

(86) PCT No.: PCT/CA2013/050744
§ 371 (c)(1),
(2) Date: Apr. 1, 2016

(87) PCT Pub. No.: WO2015/048874
PCT Pub. Date: Apr. 9, 2015

(65) Prior Publication Data
US 2016/0252647 A1    Sep. 1, 2016

(51) Int. Cl.
*G01V 5/00* (2006.01)
*H04N 13/189* (2018.01)
(Continued)

(52) U.S. Cl.
CPC .......... *G01V 5/0016* (2013.01); *F16M 13/02* (2013.01); *G01V 5/005* (2013.01); *G01V 5/0058* (2013.01);
(Continued)

(58) Field of Classification Search
CPC .... G01V 5/0016; G01V 5/005; G01V 5/0058; G01N 23/00; G01N 2223/00;
(Continued)

(56) References Cited

U.S. PATENT DOCUMENTS

| 5,541,856 A | 7/1996 | Hammermeister |
| 6,005,912 A | 12/1999 | Ocleppo |

(Continued)

FOREIGN PATENT DOCUMENTS

| CA | 1 301 371 C | 5/1992 |
| CA | 2 574 402 A1 | 1/2006 |

(Continued)

OTHER PUBLICATIONS

Supplementary European Search Report for corresponding European Patent Application No. 13895106.6 dated May 19, 2017, 10 pages.

(Continued)

*Primary Examiner* — David Porta
*Assistant Examiner* — Meenakshi Sahu
(74) *Attorney, Agent, or Firm* — Hartman Global IP Law; Gary M. Hartman; Domenica N. S. Hartman

(57) ABSTRACT

A scanning system, corresponding bracket and method are for scanning an object. The system has a frame defining a scanning chamber in which the object to be scanned is placed. The system also has a displacement assembly which displaces the object into and out of the scanning chamber. The system can also have a source which emits electromagnetic radiation or X-rays against the object within the scanning chamber such that the EM radiation passes through the object. The system can also have detectors arranged around the scanning chamber which detect the EM radiation which passes through the object. Each of the detectors forms a detector angle with a plane which can vary from one detector to the next. Similarly, the source can form an angle with the horizontal plane. The system, bracket, and method allow for the production of representative three-dimensional views of the object.

25 Claims, 9 Drawing Sheets

(51) Int. Cl.
*H04N 13/243* (2018.01)
*F16M 13/02* (2006.01)
*G06T 15/00* (2011.01)
*H04N 13/122* (2018.01)

(52) U.S. Cl.
CPC ......... *G06T 15/005* (2013.01); *H04N 13/122* (2018.05); *H04N 13/189* (2018.05); *H04N 13/243* (2018.05); *G06T 2207/10116* (2013.01)

(58) Field of Classification Search
CPC .... G01N 23/04; G01N 23/044; G01N 23/046; G01N 23/10; G01N 2223/3308; G01N 2223/639; G01N 2223/643
USPC ...... 250/472.1; 378/9, 19, 57, 62, 98.3, 98.8
See application file for complete search history.

(56) References Cited

U.S. PATENT DOCUMENTS

| | | | |
|---|---|---|---|
| 6,018,562 A | 1/2000 | Willson | |
| 6,081,580 A | 6/2000 | Grodzins et al. | |
| 6,218,943 B1 | 4/2001 | Ellenbogen | |
| 6,453,003 B1 | 9/2002 | Springer et al. | |
| 6,453,007 B2 | 9/2002 | Adams et al. | |
| 6,895,072 B2 | 5/2005 | Schrock et al. | |
| 6,993,111 B1 | 1/2006 | Annis | |
| 7,020,241 B2 | 3/2006 | Beneke et al. | |
| 7,162,005 B2 | 1/2007 | Bjorkholm | |
| 7,164,750 B2 | 1/2007 | Nabors et al. | |
| 7,221,732 B1 | 5/2007 | Annis | |
| 7,319,737 B2 | 1/2008 | Singh | |
| 7,417,440 B2 | 8/2008 | Peschmann et al. | |
| 7,486,772 B2 | 2/2009 | Lu et al. | |
| 7,579,845 B2 | 8/2009 | Peschmann et al. | |
| 7,606,348 B2 | 10/2009 | Foland et al. | |
| 7,634,051 B2 | 12/2009 | Robinson | |
| 7,656,995 B2 | 2/2010 | Robinson | |
| 7,672,427 B2 | 3/2010 | Chen et al. | |
| 7,693,261 B2 | 4/2010 | Robinson et al. | |
| 7,831,012 B2 | 11/2010 | Foland et al. | |
| 8,098,794 B1 | 1/2012 | Fernandez | |
| 8,138,770 B2 | 3/2012 | Peschmann et al. | |
| 8,233,588 B2 | 7/2012 | Gibson et al. | |
| 8,284,896 B2 | 10/2012 | Singh | |
| 8,428,217 B2 | 4/2013 | Peschmann | |
| 8,478,016 B2 | 7/2013 | Robinson | |
| 8,537,968 B2 | 9/2013 | Radley | |
| 8,674,706 B2 | 3/2014 | Peschmann et al. | |
| 8,774,357 B2 | 7/2014 | Morton | |
| 8,879,791 B2 | 11/2014 | Drouin et al. | |
| 9,042,511 B2 | 5/2015 | Peschmann | |
| 9,268,058 B2 | 2/2016 | Peschmann et al. | |
| 2008/0063140 A1 | 3/2008 | Awad | |
| 2009/0010386 A1 | 1/2009 | Peschmann | |
| 2009/0285353 A1 | 11/2009 | Ellenbogen et al. | |
| 2010/0098218 A1* | 4/2010 | Vermilyea ............. G21K 1/025 378/144 |

FOREIGN PATENT DOCUMENTS

WO 2006/137919 A2 12/2006
WO 2008/133765 A2 11/2008

OTHER PUBLICATIONS

International Search Report for corresponding International Patent Application No. PCT/CA2013/050744 dated Jun. 10, 2014.

* cited by examiner

SCANNING SYSTEM, METHOD, AND CORRESPONDING BRACKET

This application is a National Stage Application of PCT/CA2013/050744, filed 1 Oct. 2013, and which application is incorporated herein by reference. To the extent appropriate, a claim of priority is made to the above disclosed application.

FIELD OF THE INVENTION

The present invention relates to scanning. More particularly, the present invention relates to a scanning system for scanning an object, as well as to a corresponding method and bracket.

BACKGROUND OF THE INVENTION

Scanning machines are often used to scan objects. These machines emit a source radiation in the direction of the object being scanned. The reaction of the object with the source radiation produces a signature, which can be read by detectors so as to identify or analyze the object.

The Applicant has filed the following patent applications related to scanning systems and methods: CA 2,574,402 and US 2008/0063140 A1.

The Applicant is also aware of the following prior art: U.S. Pat. No. 6,018,562 A, and U.S. Pat. No. 6,218,943 B1.

Hence, in light of the aforementioned, there is a need for a device which, by virtue of its design and components, would be able to overcome or at least minimize some of the drawbacks of the prior art.

SUMMARY OF THE INVENTION

One object of the present invention is to provide a solution to at least one of the above-mentioned prior art drawbacks.

In accordance with an aspect of the present invention, there is provided a scanning system for scanning an object comprising:

a frame having a scanning chamber for receiving the object, the scanning chamber having opposed side surfaces and a third surface extending between the side surfaces;

a displacement assembly engageable with the scanning chamber, the displacement assembly configured for receiving the object and displacing the object into the scanning chamber;

a source mountable to the frame about the scanning chamber, the source configured for emitting electromagnetic radiation against the object in the scanning chamber so that the electromagnetic radiation impacts and passes through the object; and a plurality of detectors mounted to the frame at least partially about the scanning chamber, each detector being inclined at a detector angle, the detector angle of at least one of the detectors having a different value than the detector angle of an adjacent detector, each detector configured for detecting the electromagnetic radiation passed through the object, thereby scanning the object.

In some embodiments, the source is inclined relative to a horizontal, such as about 20° relative to the horizontal. The source can be mounted to the frame below the displacement assembly, or above the displacement assembly. The source may be configured for emitting electromagnetic radiation from a focal point as a beam having beam boundaries, the beam boundaries being separated by an angular interval of about 80°.

In some embodiments, each detector has a detector card having a centre point and edges. Each detector may be inclined at a corresponding detector angle such that the centre point of each detector card is substantially perpendicular to the focal point. Further optionally, each detector card is inclined at a corresponding detector angle such that the edges of each detector card engage at least one of the third surface and the side surfaces of the scanning chamber.

In some embodiments, the plurality of detectors can include two rows of detectors mounted to the frame, the first row of detectors being disposed adjacent to one of the side surfaces of the scanning chamber, and the second row of detectors being disposed adjacent to the third surface of the scanning chamber. The first and second rows of detectors may form an angle with respect to a horizontal between about 89° and about 45°, or between about 80° and about 70°.

In accordance with another general aspect of the invention, there is provided a bracket for a scanning system for scanning an object, comprising:

a bracket frame mountable to the scanning system, the bracket frame being inclined relative to a horizontal;

a source for emitting electromagnetic radiation through the object, the source mountable to the bracket frame; and a plurality of detectors mountable to the bracket frame, each detector being inclined at a detector angle, the detector angle of at least one of the detectors having a different value than the detector angle of an adjacent detector, each detector configured for detecting the electromagnetic radiation passed through the object, thereby scanning the object.

In accordance with yet another general aspect of the invention, there is provided a method of generating a three-dimensional image of a scanned object, comprising the steps of:

receiving, at an input port, image data of an object, having been captured via a plurality of detectors disposed at least partially about the object, at least two adjacent ones of the detectors being angled one with respect to the other;

by means of a processor, generating from the image data, an image representing a perspective view of the object; and storing said image into a storage for presenting on a display, a three-dimensional representation of the object.

In some embodiments, the generating comprises juxtaposing into a row, the image data received from adjacent detectors. In some embodiments, the image data received comprises image captures of segments of the object, and the juxtaposing step is repeated for each one of the segments, the generating step further comprising concatenating the rows.

In some embodiments, the method further comprises normalizing the image of the object, by means of a normalizing module integrated in the processor. The normalizing may comprises at least one of: correcting an offset for a given pixel of the image data in relation to an offset reference, and correcting a gain for a given pixel of the image data in relation to a gain reference.

In some embodiments, the image data received comprises low energy absorption data and high energy absorption data for each of one or more pixel of the image data. The method may further comprise fusing the low energy absorption data and high energy absorption data for one or more pixel of the image of the object, by means of a fusion module integrated in the processor.

In some embodiments, the method further comprises calculating, by means of a calculator integrated in the processor, an atomic number for one or more pixel of the image data. The calculating may comprise:

receiving said low energy absorption data and high energy absorption data;

receiving a signal level of a source emission detected by the detectors; and referencing, via reference data stored in the storage, an atomic number to the combination of the low energy absorption data, the high energy absorption data and the signal level of the source emission.

In some embodiments, the method further comprises sharpening the image of the object. The sharpening may include convoluting the image data to enhance portions of the image representing edges of the object.

In accordance with yet another general aspect of the invention, there is provided a data storage (preferably non-transitional) comprising data and instructions for execution by a processor to generate a three-dimensional image of a scanned object, said data and instructions comprising:

code means for receiving image data of an object, having been captured via a plurality of detectors disposed at least partially about the object, at least two adjacent ones of the detectors being angled one with respect to the other;

code means for generating from the image data, an image representing a perspective view of the object; and code means for storing said image into a storage for presenting on a display, a three-dimensional representation of the object.

In accordance with yet another general aspect of the invention, there is provided a system for generating a three-dimensional image of a scanned object, comprising:

an input port for receiving image data of an object, having been captured via a plurality of detectors disposed at least partially about the object and in an angled configuration, wherein at least two adjacent ones of the detectors are angled one with respect to the other;

a processor for generating from the image data, an image representing a perspective view of the object; and a storage for presenting the image on a display as a three-dimensional representation of the object.

In accordance with still another general aspect of the invention, there is provided a scanning system for scanning an object, comprising:

a radiation source for emitting electromagnetic radiation toward an object to be scanned; and a plurality of detectors disposed at least partially about a scanning area, each detector being mounted substantially perpendicularly in relation to the radiation source for capturing the radiation traversing the object from different angles and thereby scanning the object according to a perspective view.

The components, advantages and other features of the system and corresponding method and bracket will become more apparent upon reading of the following non-restrictive description of some optional configurations, given for the purpose of exemplification only, with reference to the accompanying drawings.

DETAILED DESCRIPTION OF PREFERRED EMBODIMENTS OF THE INVENTION

In the following description, the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present invention illustrated in other figures can be easily inferred therefrom. The embodiments, geometrical configurations, materials mentioned and/or dimensions shown in the figures are optional, and are given for exemplification purposes only.

Furthermore, although the present invention may be used for scanning objects, such as for threat detection or imaging, and as a result, is sometimes described in the context of a possible use for detecting dangerous objects and/or producing 3D images, it is understood that it may be used for other purposes, and in other fields and/or activities. For this reason, expressions such as "scan", "threat detection", "dangerous object", "chemical", "imaging", "3D", etc. as used herein should not be taken as to limit the scope of the present invention to the detection of threats or the production of 3D images in particular. These expressions encompass all other kinds of materials, objects and/or purposes with which the present invention could be used and may be useful, as can be easily understood.

Broadly described, the present invention provides a system, method, and bracket which can improve the process for scanning and detecting an object so as to generate a 3D image of said object, as but one possible example of a use of the invention.

Figure 1:
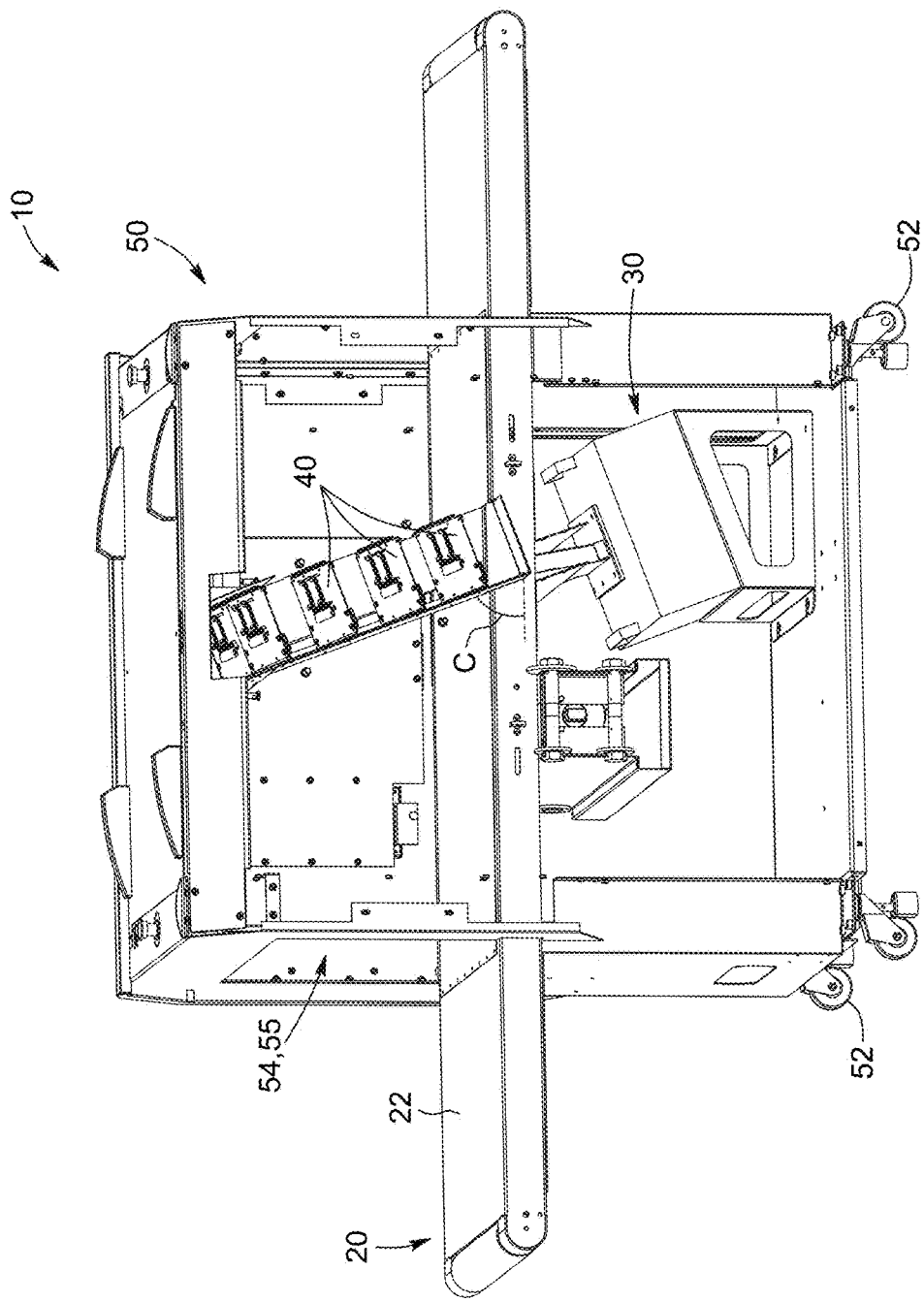
FIG. 1 is a perspective view of a scanning system providing a partially exposed view of a source, a displacement assembly, and a plurality of detectors of the scanning system, according to an optional embodiment of the present invention.

According to a general aspect, there is provided a system 10 for scanning an object 12, an example of which is shown in FIG. 1. The system 10 can be any assembly or collection of components intended to form a machine or structure capable of providing the functionality and advantages described in the present disclosure. The object 12 can be any item, of any shape or configuration, which can be scanned.

The object 12 can be made from living or non-living material. The term "scan" or "scanning" as used herein refers to the ability of the system 10 to scrutinize, analyse and/or examine the object 12 for any suitable purpose. In some embodiments, "scanning" refers to the ability of the system 10 to project a source of radiation in a predetermined pattern towards the object 12 in order to obtain information about the object 12. One possible purpose for scanning the object 12 is to detect the composition or nature of the object 12 in order to determine whether it may constitute a threat. Another possible purpose for scanning is to generate an image of the object and/or its interior. Yet another possible purpose for scanning the object 12 is to assess its interior contents or make-up. It can thus be appreciated that the system 10 can scan the object 12 for any number of reasons, all of which are within the scope of the present disclosure.

The system 10 has a frame 50, an example of which is also shown in FIG. 1. The frame 50 can be any partially, or fully, open or closed structure which gives shape to the system 10 and provides it with structural support. It can thus be appreciated that the frame 50 can take many different configurations in order to achieve such functionality. In the embodiments shown in the figures, the frame 50 is shown as a substantially rectangular cuboid, but it is appreciated that it is not limited to this shape. In some embodiments, the frame 50 can be supported by wheels 52 or other suitable displacement devices, thereby advantageously allowing the system 10 to be displaced as desired.

Figure 2:
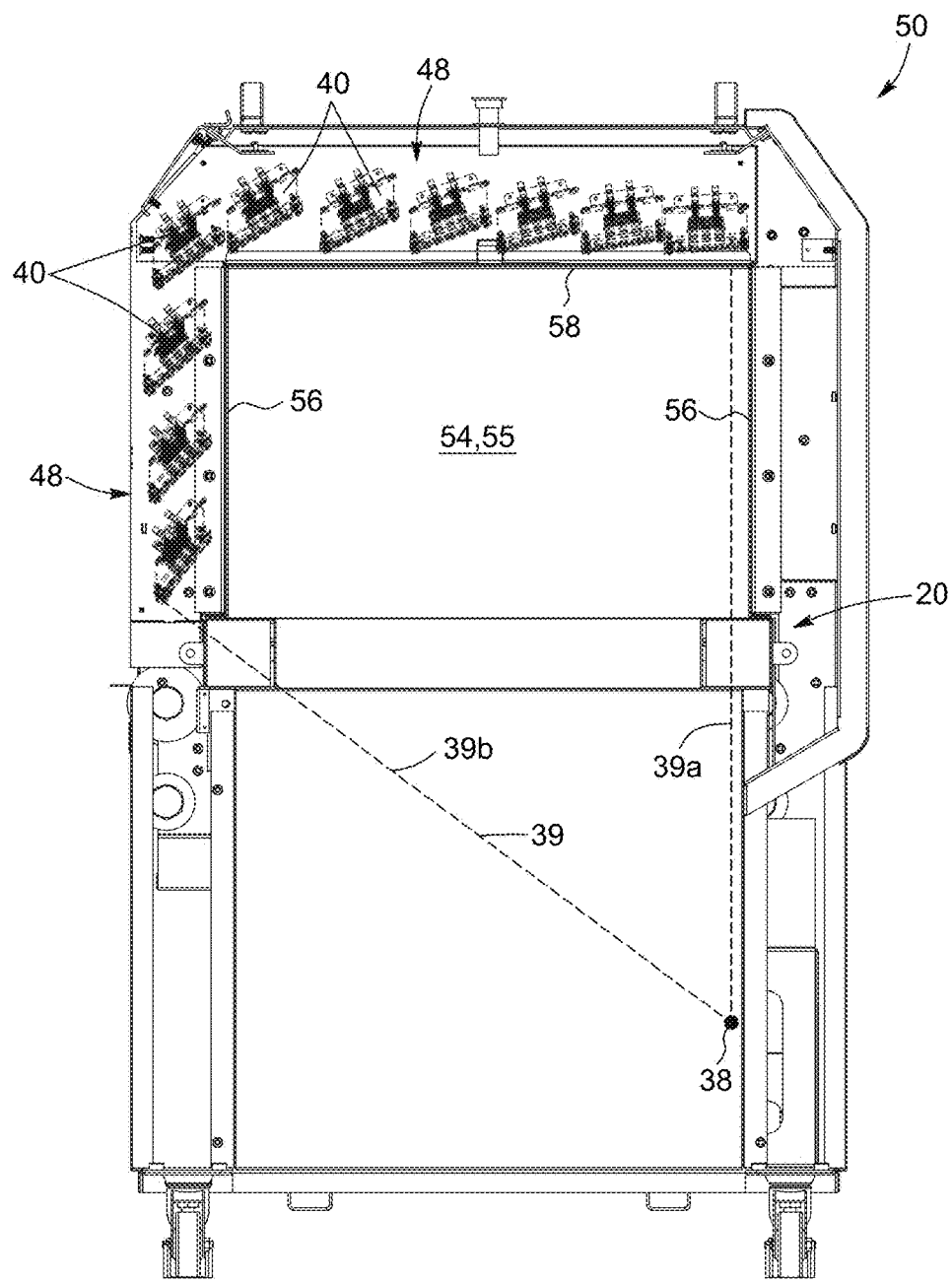
FIG. 2 is a front view of the scanning system of FIG. 1.

The frame 50 has a scanning chamber 54, an example of which is shown in FIG. 2, which receives the object 12 to be scanned. The scanning chamber 54 can be any enclosed, or partially enclosed, volume or space mounted in, near, or around the frame 50. The scanning chamber 54 has side surfaces 56, each one being in opposed relation to the other, as well as a third surface 58 which extends between the side surfaces 56. The surfaces 56,58 can be walls or other planar or non-planar faces which define the boundaries of the scanning chamber 54. Such a configuration of surfaces 56,58 allows for many different types of scanning chambers 54 to be used.

In one possible embodiment, the scanning chamber 54 can be a drawer into which the object 12 can be placed so as to be scanned. The drawer scanning chamber 54 can have two vertical side surfaces 56 supported and connected together by a bottom horizontal third surface 58 upon which the object 12 can rest. In another possible embodiment, the scanning chamber 54 can consist of a relatively large framework into which vehicles and other large devices can be placed. This framework scanning chamber 54 can have two vertical side surfaces 56 connected together by a top horizontal third surface 58, thus defining a passage through which the object 12 can be displaced. Such a framework scanning chamber 54 can advantageously be used to scan cargo containers and other similar large objects.

In yet another possible embodiment, an example of which is shown in the figures, the scanning chamber 54 is a tunnel 55. The tunnel 55 can have an opening at each of its ends, thus defining a passage or channel which extends through some, or all, of the frame 50. The dimensions of the tunnel 55 can vary depending upon a number of factors, such as the following non-limitative list: the nature and shape of objects 12 to be scanned, the cost of implementation of the system 10, and the space available for the system 10. Although shown as substantially box-like, the tunnel 55 can be non-linear, winding, or take other configurations which permit it to receive the object 12 to be scanned.

The system 10 also has a displacement assembly 20, an example of which is shown in FIG. 1. The displacement assembly 20 engages with the scanning chamber 54 so that it can receive the object 12 and displace it into the scanning chamber 54. In so doing, the displacement assembly 20 advantageously maintains safety by helping to ensure that no effort is required by an operator to move the object 12 into the scanning chamber 54. The nature of the displacement assembly 20, and its relationship with the scanning chamber 54, can vary.

Indeed, in the optional embodiment where the scanning chamber 54 is a drawer, the displacement assembly 20 can be a mechanism which engages the drawer scanning chamber 54 from the exterior of the drawer scanning chamber 54 so as to open and close the drawer scanning chamber 54. In the optional embodiment where the scanning chamber 54 is a framework, the displacement assembly 20 can be a vehicle or other similar mover of the object 12 so as to engage the framework scanning chamber 54 by moving the object 12 into the passage defined by the framework scanning chamber 54. In the optional embodiment where the scanning chamber 54 is a tunnel 55, the displacement assembly 20 can be a conveyor 22 or conveyor belt. The conveyor 22 engages the scanning chamber 54, which can be a tunnel 55, by extending through the scanning chamber 54 so as to convey the object 12 through the scanning chamber 54.

In any of its configurations, the displacement assembly 20 can stop, accelerate, decelerate, or otherwise control the displacement of the object 12, and its direction, within or through the scanning chamber 54. Such functionality advantageously allows for the object 12 to be rescanned or further analysed, if desired. Furthermore, and in light of the preceding description of some of its optional embodiments, it can be appreciated that the displacement assembly 20 can take many different configurations, and engage the scanning chamber 54 in many different ways.

The system 10 also has a source 30, an example of which is also shown in FIG. 1. The source 30 emits electromagnetic (or EM) radiation against the object 12 in the scanning chamber 54. In most embodiments, but not necessarily all, the EM radiation is X-rays, and the term "X-rays" will thus be used throughout the present disclosure, such use being understood as not limiting the source 30 to emitting only X-ray radiation. The emission of the EM radiation can be performed continuously, at discrete intervals, or only as the object 12 is displaced into, or passed through, the scanning chamber 54. The term "against" refers to the ability of the EM radiation to impact the object 12 and pass through the same. The effect of the object 12 on the EM radiation as it passes through can be detected by the detectors described below. It will be appreciated that not all of the EM radiation emitted by the source 30 must impact the object 12.

Figure 3:
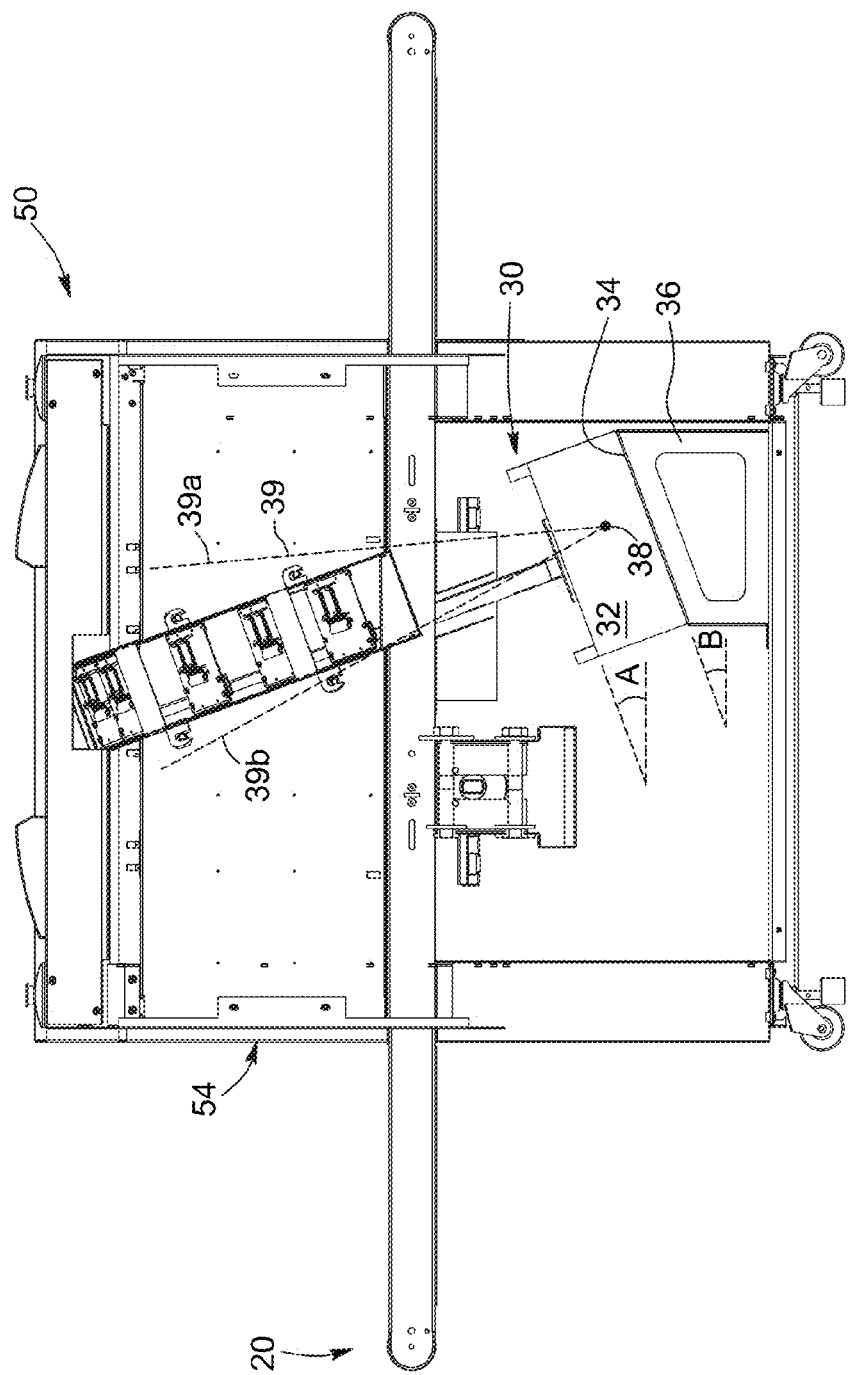
FIG. 3 is a side elevational view of the scanning system of FIG. 1.

The source 30 is "mountable to the frame about the scanning chamber", which means that it can fixedly or removably attached to the frame 50 in proximity to the scanning chamber 54. The source 30 can also mounted to the frame 30 so that it can rotate, pivot, or be displaced around the object 12, which can remain in a fixed position. The actual location and position of the source 30 can depend on the configuration of the scanning chamber 54 and the displacement assembly 20, among other possible factors. In some embodiments, the source 30 can be mounted to the frame 50 at a location below the displacement assembly 20, as shown in FIG. 3. This configuration can be suitable where the displacement assembly 20 is a conveyor 22, and it allows the source 30 to emit the EM radiation in an upward direction into the scanning chamber 54 so as to impact the object 12 being conveyed on the conveyor 22. In some embodiments, the source 30 can be mounted to the frame 50 at a location that is above the displacement assembly 20. This configuration can be suitable where the displacement assembly 20 is a framework displacement assembly 20, for example, and it allows the source 30 to emit the EM radiation in a downward direction into the scanning chamber 54 to the object 12. The source 30 can also be mounted to the frame from the sides or from other orientations, as required.

The source 30 can have many different configurations. In one possible embodiment, an example of which is shown in FIG. 3, the source 30 is inclined relative to a horizontal plane at an angle A. The inclination of the source 30 at the angle A allows for the generation of data which may be useful for certain purposes. For example, where the purpose of scanning the object 12 is to generate a 3D image of the object 12, the inclination of the source 30 (and thus of the X-rays emitted by the source 30 and impacting the object 12) permits obtaining data for the top and the sides of the object 12, thus advantageously allowing for the production of a perspective 3D view of the object. In contrast, conventional non-inclined sources may not be able to generate data regarding the top or sides of an object, and may thus be able to generate only 2-D views. The angle A can vary depending on a number of factors, such as the size of the scanning chamber 54, the position of the source 30 relative to the scanning chamber 54, the coverage of the EM radiation in the scanning chamber 54, etc. In most embodiments, but not necessarily all, the angle A is between about 10° and about 20°.

In some embodiments, an example of which is shown in FIG. 3, the source 30 includes an X-ray emitter 32 which can be mounted to, and removed from, a mounting surface 34 of an inclined support 36. The X-ray emitter 32 can emit X-rays into the scanning chamber 54 and against the object 12 found therein or displaced therethrough. The mounting surface 34 can be any face or area upon which the X-ray emitter 32 can be attached, and the inclined support 36 can be any structure of device which supports the X-ray emitter 32. The mounting surface 34 may be inclined so as to form an angle B with respect to the horizontal. In being inclined, the mounting surface 34 also inclines the X-ray emitter 32 attached thereto, thereby advantageously allowing the X-ray emitter 32 to emit X-rays at an angle to the horizontal. Optionally, the angle B can vary between about 1° and about 45°, and further optionally between about 10° and about 20°. Such a range of values for angle B can optimize the quantity of information in the resulting image produced of the object 12.

In some embodiments, the source 30 can emit EM radiation or X-rays from a focal point 38 as a beam 39. The beam 39 can be any fan or cone beam having an angular width as it is emitted from the focal point 38. The angular width of the beam 39 observed from one direction may be different from the angular width of the same beam 39 observed from another direction. This can be better appreciated by comparing the example of the beam 39 as shown in FIGS. 2 and 3. In FIG. 3, the beam 39 has an angular width that is smaller (i.e. fewer degrees wide) than the angular width of the same beam 39 shown in FIG. 2. The beam 39 can be defined by its beam boundaries 39a,39b. The angular width or interval between these beam boundaries 39a,39b can vary, and can optionally be about 80°. In some embodiments, and as shown in FIG. 2, one of the beam boundaries 39b can be substantially aligned with one of the side surface 56 of the scanning chamber 54. Such an alignment can advantageously allow the beam 39 to cover or span the entire useful width of the scanning chamber 54, and allow for generating an image that is more representative of the object 12.

Figure 4:
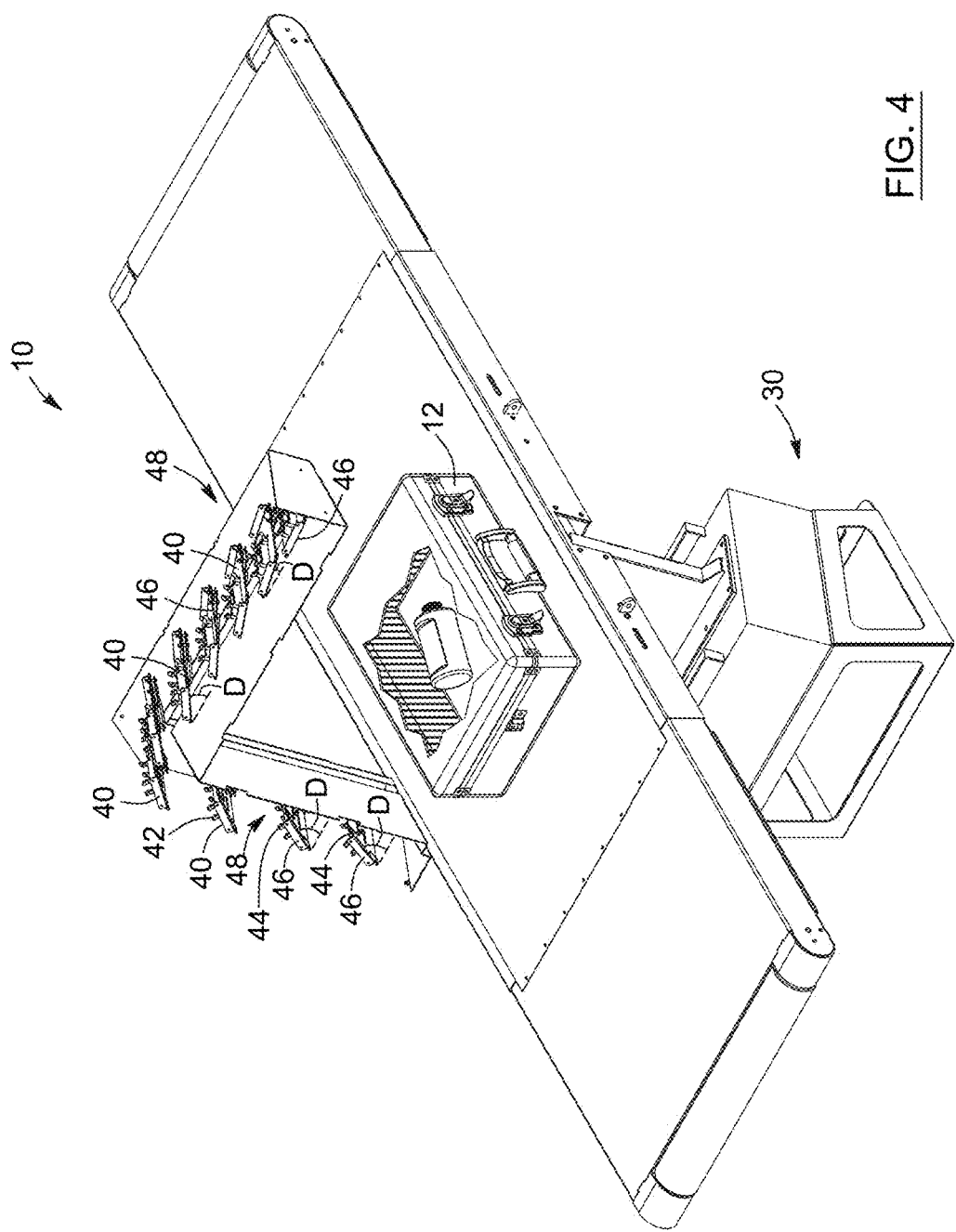
FIG. 4 is a perspective view of a source, a plurality of detectors, and a displacement assembly for a scanning system, according to an optional embodiment of the present invention.

The system 10 also has a plurality of detectors 40, examples of which are shown in FIG. 4. The detectors 40 receive the EM radiation which passes through the object 12, thus scanning the object 12 by allowing for the EM radiation to be analysed. The detectors 40 are mounted or fixed to the frame 50 at least partially about the scanning chamber 54. The expression "at least partially about the scanning chamber" refers to the orientation and positioning of the detectors 40 in proximity to the scanning chamber 54 so that they can detect the EM radiation passed through the object. Such orientation and positioning can vary depending on numerous factors such as the size of the scanning chamber 54, the desired detector 40 coverage, and the type of detector 40 used. In the optional embodiments shown in the figures, the detectors 40 are positioned in an "L"-shape on the frame 50 so that they cover the top and one of the sides of the scanning chamber 54. In other optional embodiments, the detectors 40 can be displaced around the object 12, which remains in a fixed position. Other configurations are within the scope of the present disclosure.

In some embodiments, each detector 40 includes a detector card 42 which has a centre point 44 and edges 46. The detector card 42 can be any suitable detector card 42 such as those manufactured by Detection Technologies Ltd., United Kingdom. Each of these detector cards 42 can have a centre point 44, which corresponds to the geographical centre of the detector cards 42. The edges 46 of each detector card 42 define its boundaries. The detectors 40 and/or the system 10 can be linked to a central processing Unit (CPU) 100 (see FIG. 7) or other processing device so that the data detected by the detectors 40 can be analysed, processed, and used to output information, such as a 3D perspective view of the object 12, as better explained further below with reference to FIG. 7.

Figure 7:
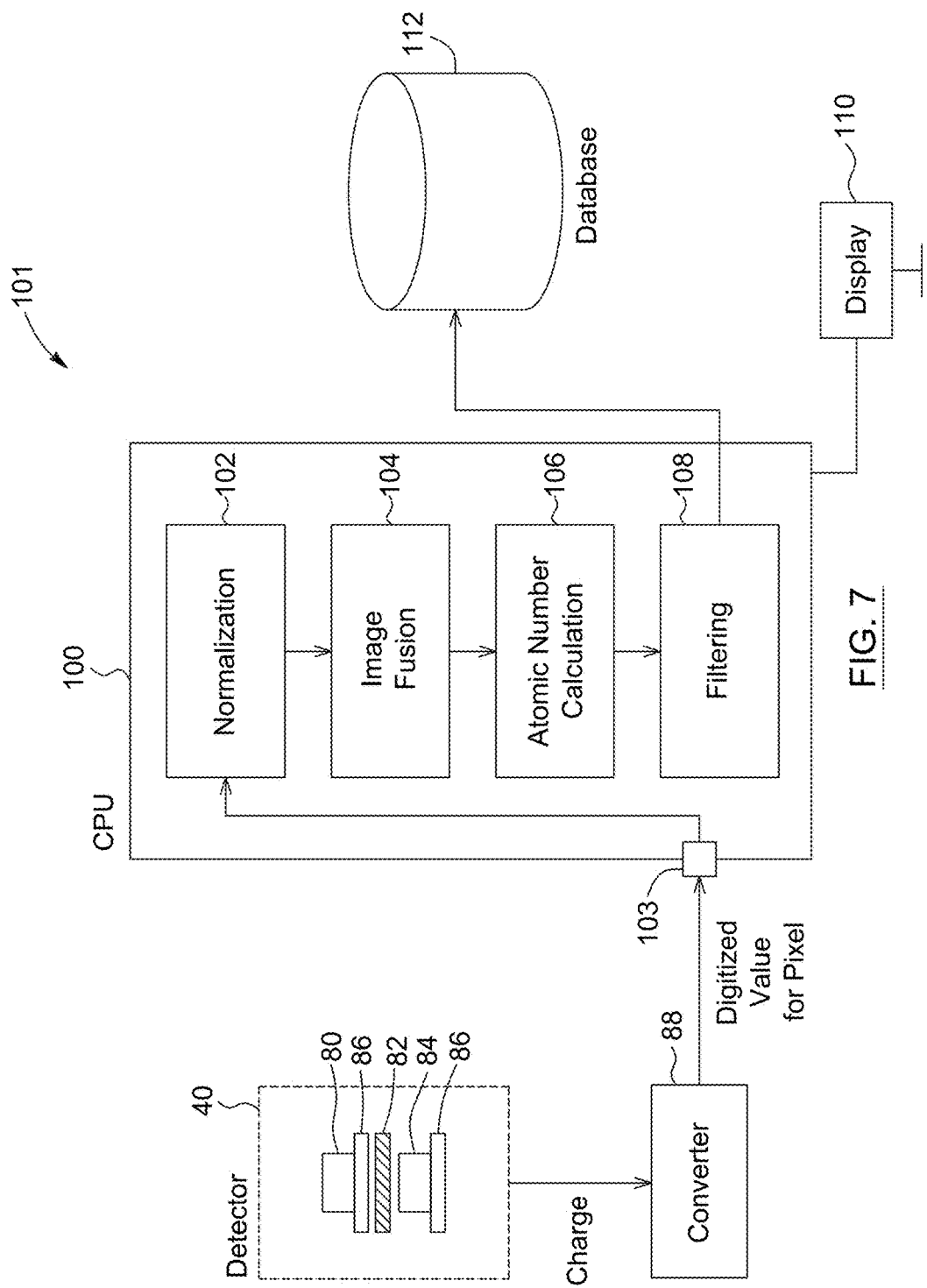
FIG. 7 is a schematic representation of a portion of the scanning system, according to an embodiment of the present invention.

According to an embodiment described and illustrated herein, each detector 40 comprises a first scintillator 80, a filter 82, and a second scintillator 84, all of which are sandwiched together, as is schematically represented in FIG. 7. The X-Ray emission impacts the first scintillator 80 which detects a lower portion of the X-Ray signal. Residual low energy signal is then stopped by the filter 82. Finally the remaining signal from the X-Ray emission reaches the second scintillator 84 which detects a higher portion of the X-Ray signal.

Each detector 40 is inclined at a detector angle D. In most embodiments, but not necessarily all, the detector angle D is defined with respect to a horizontal plane. The detector angle D of one or more of the detectors 40 is different than the detector angle D of an adjacent detector 40. For example, this can mean that the detector angle D of at least one detector 40 is different than the detector angle D of all the other detectors 40. This can also mean that each detector 40 has a detector angle D that is different from the detector angles D of its neighbouring detectors 40. The term "adjacent" in this context refers to neighbouring detectors 40, whether they are located directly next to, or nearby, the at least one detector 40 having a different detector angle D. The determination of the detector angle D for each detector 40 can depend upon numerous factors such as, but not limited to: the angle of the source 30 relative to the horizontal, the position of the source 30 relative to the scanning chamber 54, the position of the centre point 44 of each detector card 42 relative to the source 30, etc.

In some embodiments, the detector angle D of each detector card 42 may optionally be determined by satisfying the following two requirements: 1) the centre point 44 of each detector card 42 is substantially perpendicular to the focal point 38 of the beam 39, and 2) each detector card 43 is positioned as close as possible to the focal point 38 of the beam 39.

Figure 5:
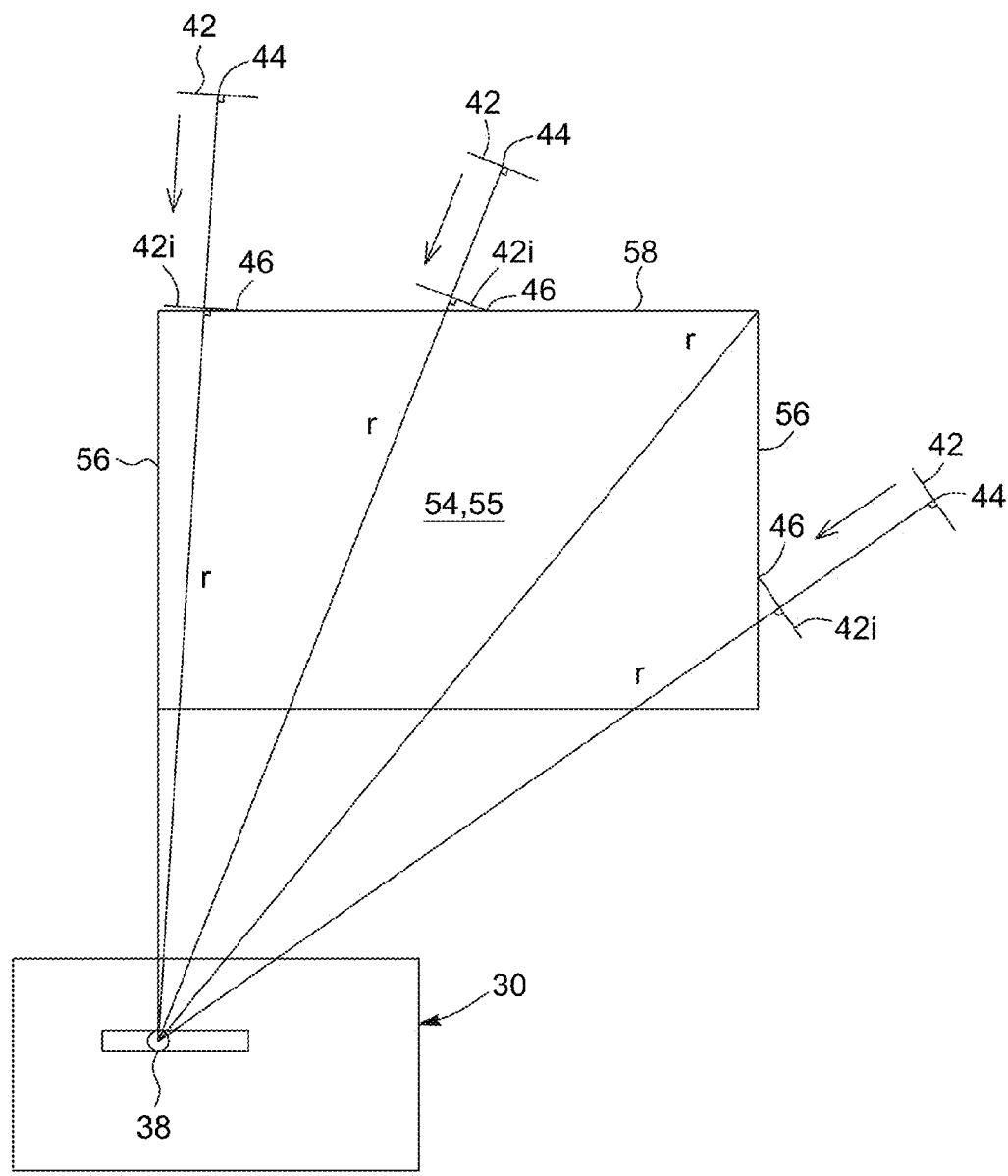
FIG. 5 is a schematic view of a plurality of detectors disposed about a scanning chamber, according to an optional embodiment of the present invention.

Reference is made to FIG. 5. In order to satisfy the first requirement, a circle of diameter r can be drawn from the focal point 38 of the beam 39 of the source 30. Each detector card 42 can be placed on this circle such that it is tangent with the circle, and such that its centre point 44 is perpendicular to the focal point 38. In order to satisfy the second criterion, each detector card 42 can be brought as close as possible to the surfaces 56,58 of the scanning chamber 54 and/or tunnel 55, thus bringing these detector cards 42 as close as possible to the focal point 38 without being inside the scanning chamber 54. This is shown schematically in FIG. 5 with the arrows directing the detector cards 42 towards the scanning chamber 54. In practice, bring the detector cards 42 closer to the scanning chamber 54 can involve placing one of the edges 46 of the detector cards 42i in contact with the either the side surfaces 56 or the third surface 58 of the scanning chamber 54 and/or tunnel 55. Indeed, some edges 46, such as those of the detector cards 42i located on the side of the scanning chamber 54, can engage the side surfaces 56 whereas other edges 46 can engage the third surface 58. Optionally, the edges 46 of neighbouring detector cards 42i can overlap one another. It can thus be appreciated from the schematic shown in FIG. 5 how the optional positioning and configuration of the detectors 40 of FIG. 4 can be achieved.

Returning to FIG. 2, the plurality of detectors 40 can have two rows 48 of detectors 40 mounted to the frame 50. The first row 48 can be disposed adjacent to one or more of the side surfaces 56, while the second row 48 can be disposed adjacent to the third surface 58 of the scanning chamber 54. It can thus be appreciated that the inclination of the source 30 and detectors 40 advantageously allows for the generation of an accurate and representative 3D perspective image of the object 12, thus eliminating the need for numerous detectors surrounding three or more sides of the scanning chamber as is known in the prior art. Optionally, the first and second rows 48 of detectors 40 can form an angle C with respect to a horizontal plane, as shown in FIG. 1. The angle C can vary, and can optionally have values ranging from about 89° to about 45°, and further optionally from about 80° to about 70°.

Figure 6:
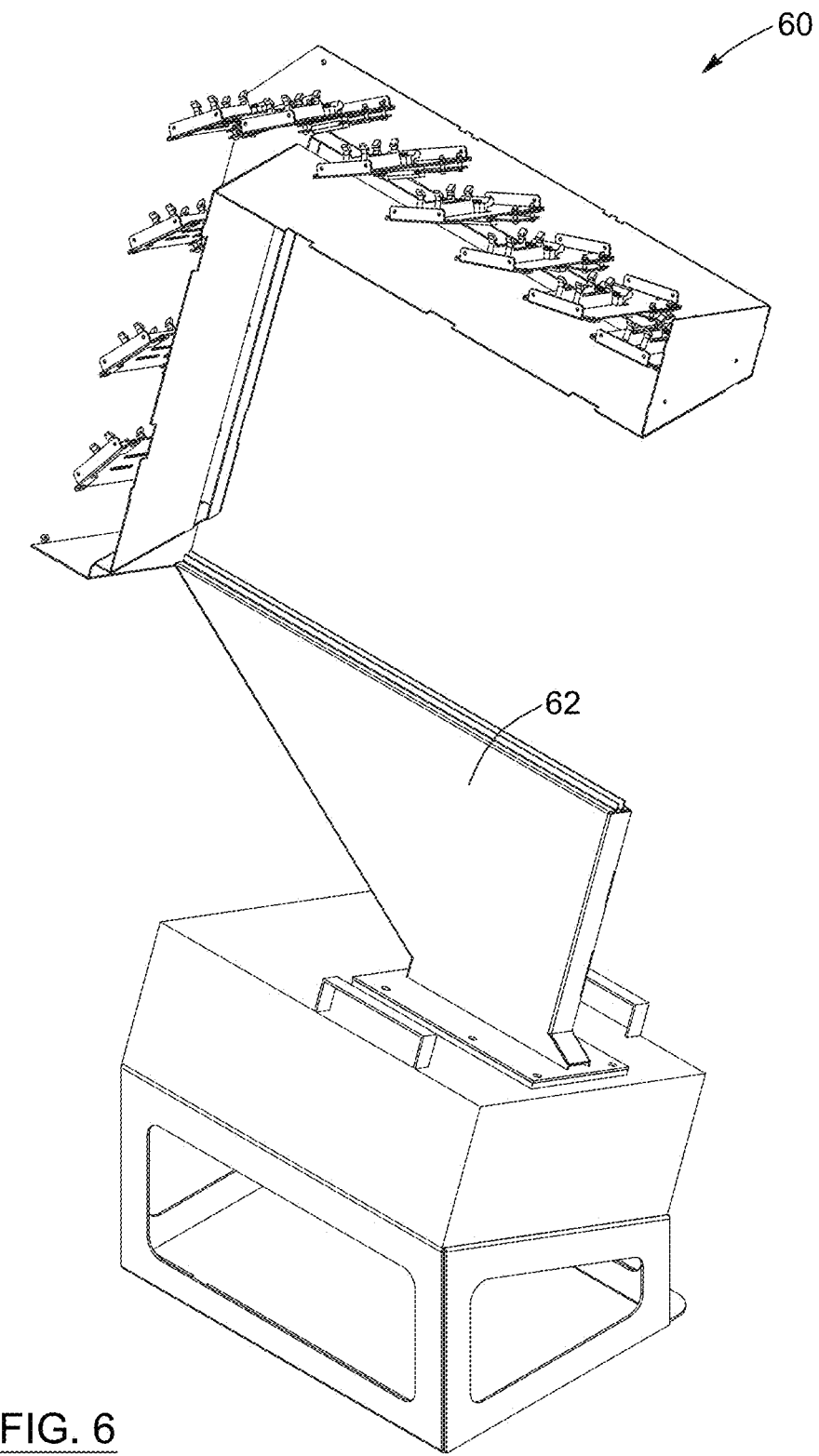
FIG. 6 is a perspective view of a bracket for a scanning system, according to an optional embodiment of the present invention.

According to another general aspect, there is a provided a bracket 60 for a scanning system, such as the one described above. Referring now to FIG. 6, the bracket 60 has a bracket frame 62 which can be mounted to, about, or within the scanning system and which is inclined relative to the horizontal. The angle of inclination can be between about 1° and about 45°, and optionally between about 10° and about 20°. The bracket 60 also has a source 30, such as the one described above, which emits EM radiation or X-rays against the object 12 being scanned. Finally, the bracket 60 has multiple detectors 40, which can have varying detector angles as explained above, and which detect the EM radiation that passes through the object 12.

The image processing of the above-described scanning system will now be better explained, with reference to FIG. 7, with further reference to FIGS. 1 and to 4, as well as FIGS. 8 to 11. In general terms, an input port 103 receives image data of an object, having been captured via a plurality of detectors 40 disposed at least partially about the object 12, at least two adjacent ones of the detectors being angled one with respect to the other, in that a given detector 40 is angled differently with respect to an adjacent detector 40. The processor 100 generates from the image data, an image representing a perspective view of the object. The image may then be store in a storage 112 for further presenting the image on a display 110, as a three-dimensional representation of the object 12. There is thus provided a corresponding system 101 which performs this process in order to generate the image.

In the context of the present description, the term "processor" refers to an electronic circuitry that can execute computer instructions, such as a central processing unit (CPU), a microprocessor, a controller, and/or the like. A plurality of such processors may be provided, according to embodiments of the present invention, as can be understood by a person skilled in the art. The processor may be provided within one or more general purpose computer, for example, and/or any other suitable computing device.

Still in the context of the present description, the term "storage" refers to any computer data storage device or assembly of such devices including, for example: a temporary storage unit such as a random-access memory (RAM) or dynamic RAM; a permanent storage such as a hard disk; an optical storage device, such as a CD or DVD (rewritable or write once/read only); a flash memory; and/or the like. A plurality of such storage devices may be provided, as can be understood by a person skilled in the art.

According to the present embodiment, the X-Ray source 30 emits a continuous spectrum of X-Rays, ranging from a lower energy range such as 10 to 70 kV (+/−) up to higher energy ranges such as 60 to 250 kV (+/−).

It is to be understood that depending on particular embodiments of the present invention, the lower energy range may be as low as 1 kV and the higher energy ranges may be greater that the values given above in relation to the described embodiment.

As the object 12 is subjected to the X-Rays, the detectors 40 capture the X-Ray energy that traverses the object 12. As previously mentioned, the first scintillator 80 detects a lower portion of an X-Ray signal, while the second scintillator 84 detects a higher portion of the X-Ray signal. The high energy range penetrates more easily through denser materials, while the low energy range provides better contrast for image portions corresponding to lighter materials.

Broadly, each of the scintillators 80, 82 converts the X-Ray energy to light. A photo-diode 86 then captures the light and generates a corresponding electric signal. The electric signal is further digitized by a converter 88. The digitized value is associated to a pixel of the image which represents the object.

Figure 8:
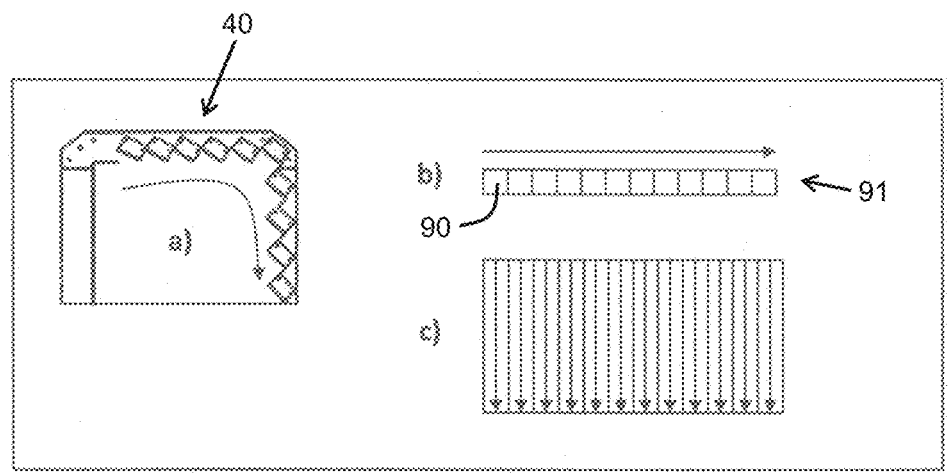
FIGS. 8a to 8c are diagrams showing steps of a method executed by the scanning system, according to an embodiment of the present invention.

In the present embodiment, the detectors' physical arrangement in the scanner system determines the arrangement of the raw data extracted therefrom. More particularly, according to the embodiment illustrated herein, detectors 40 are aligned in a row, positioned as previously mentioned, along an "L"-shaped configuration, as schematically represented in FIG. 8(*a*). For a given scan capture, image data is received from each detector and organized based on the positioning of the detectors 40, as schematically represented at FIG. 8(*b*), where each subdivision 90 represents data captured by a corresponding detector at a given scan capture. Each subdivision 90 corresponds to 64 pixels of image data, in the present embodiment. The resulting row 91 provide a segment of the resulting image.

Figure 10:
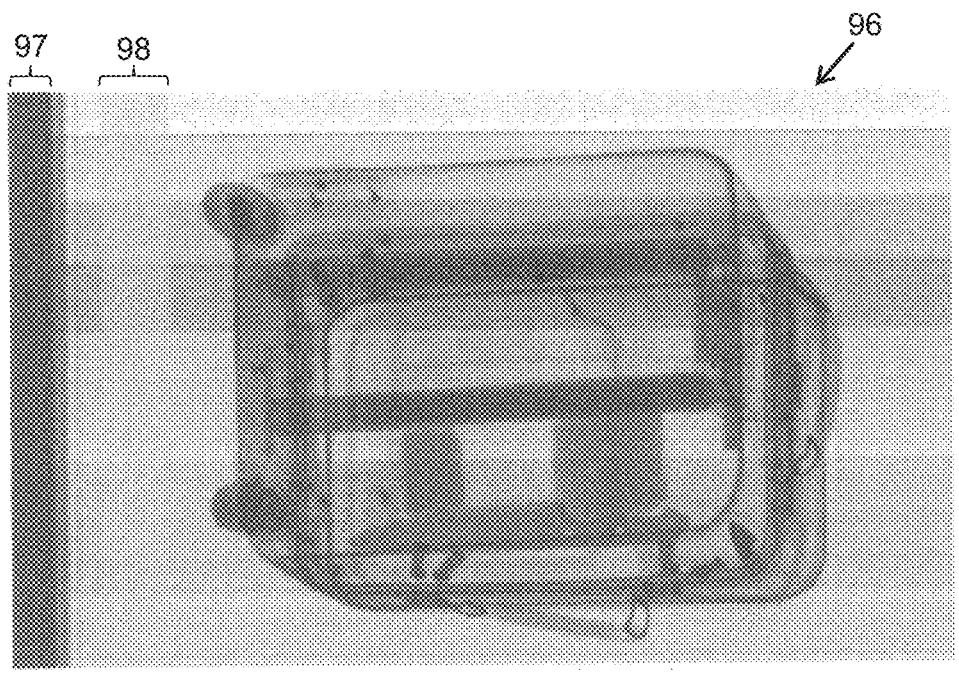
FIG. 10 is an image of an object having been scanned by the scanning system, according to an embodiment of the present invention, prior to a normalizing step.
Figure 11:
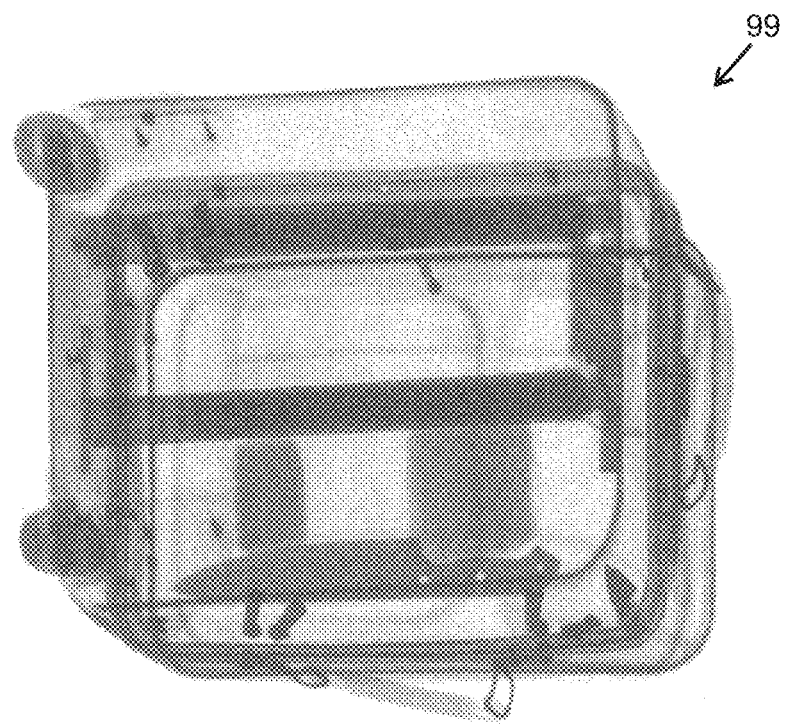
FIG. 11 is an image of an object having been scanned by the scanning system, according to an embodiment of the present invention, after a normalizing step.

As the object 12 moves through the scanning chamber 54, the detectors perform scan captures sequentially at a given rate, which may depend on their integration time, i.e. exposure time. Thus several of said "rows" of data are acquired in a given scanning process. The rows are juxtaposed as schematically represented in FIG. 8(c), to represent all the image captures of the detectors in a given scanning process, thereby producing the resulting image 96, 99 of the object 12 (see FIGS. 10 and 11). This image provides a perspective view of the image, as can be seen in FIGS. 10 and 11, by virtue of the detectors being positioned as different angles depending on their location in relation to the source emission.

Figure 9:
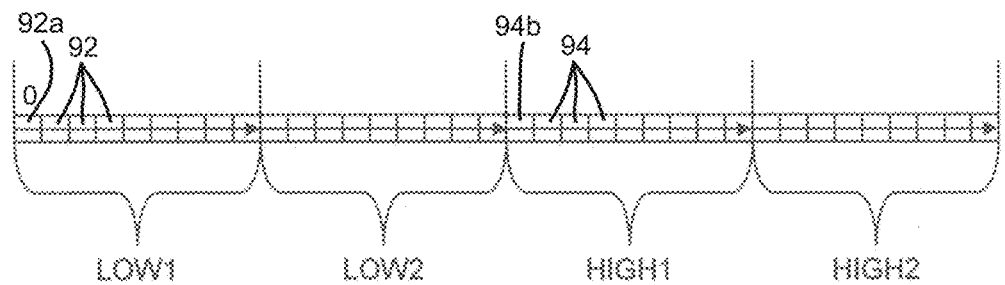
FIG. 9 is a diagram of a step of the method executed by the scanning system, according to an embodiment of the present invention.

In FIG. 9, the rows "LOW1" and "HIGH1" correspond to the image capture of each of the low energy absorption scintillator 80 and the low energy absorption scintillator 84, respectively. The rows "LOW2" and "HIGH2" represent data collected from a second set of detectors, which may be located for example across from the first row of detectors 40, to detect an emission from another source, in accordance with an alternative embodiment. Thus each of the subsection 92 of the row "LOW1" corresponds to a subsection 94 of the row "HIGH1". For example, the first boxes 92a and 94a correspond together and represent a capture of a same portion of the object 12 being scanned.

As previously mentioned, the X-Ray energy is translated into a digitized value, for each pixel, via the scintillators 80, 82, the photo-diodes 86 and the converter 88. In the conversion by the photo-diodes 86 of the light into an electric signal, some error may occur, in that a given light source may result in different electrical signals due to the fact that every detector card behave slightly differently to the presence or absence of X-Ray signal.

Thus, in order to correct these variations and for the final image to appear more homogeneously, a normalization module 102, by means of the CPU 100, normalizes (or "calibrates") each pixel of the low and high energy captures, by correcting an offset and a gain in the light conversion. FIG. 10 shows a raw image 96 of the scanned object 12, prior to normalization. FIG. 11 shows the image 99 after normalization.

The offset is determined based on the signal perceived by the scintillators of the detectors when no source is emitted. When no source is emitted, as represented by the dark band 97 appearing in FIG. 10, it is expected that the scintillators would transmit a signal corresponding to 0, the theoretic value. However, due to some imperfections in the hardware, a signal is still generated, and each pixel may correspond to a different signal. The offset for each pixel corresponds to the difference between the value perceived (for example, 130, 160, 110) based on the signal generated when there is no source emission, and the value 0, the theoretic value. Thus, to correct the offset for each pixel, the corresponding offset value is subtracted from the pixel's value.

After removing the offset, there are still variations in the capture of each detector when fully exposed to the source emission, as represented by the light band 98 appearing in FIG. 10. Thus, for every pixel, the mean maximum value representing the gain is determined. To correct the inhomogeneous response of each pixel, the measured value is divided by this maximum signal at full exposure. These values are finally multiplied by a fixed identical scaling factor.

The high and low energy information is then fused, at an image fusion module 104, by means of the CPU 100. More particularly, each pixel of the image results from a combination of high energy data in some proportion and low energy data in some proportion. Depending on the density of the material detected, it may be desirable to emphasize the low energy information or the high energy information in suitable proportion. Indeed, as previously mentioned, the high energy range penetrates more easily through denser materials, while the low energy range provides better contrast for image portions corresponding to lighter materials. The high and low energy data is thus combined accordingly to better illustrate particular regions of the image. For example, a pixel may be the result of 25% of the high energy data and 75% of the low energy data because it is determined by the X-Ray signal is relatively high, meaning that it is more desirable to see contrast. The proportion of high and low energy is determined based on ranges of low energy data value and/or high energy data value for a particular pixel.

An atomic number is then associated to each pixel of the image, via an atomic number calculation module 106, by means of the CPU 100. More particularly, the atomic number is determined based on the low energy absorption data and high energy absorption data, as well as a signal level of a source emission 30.

In a calibration step, materials having a known atomic number are scanned, in order to correlate each of their particular combination of low and high energy, for a given source signal level, with their atomic number. Based on the correlations made based on the known materials, a set of reference data is generated. The reference data includes combinations of low and high energy (at a given source signal level) and their corresponding atomic number. Thus, for each pixel, the combination of the corresponding low and high energy data, is correlated with a corresponding atomic number.

The image is then sharpened via a filtering module 108, by means of the CPU 100, in order to reduce blurriness when the image is displayed for viewing on a display 110. More particularly, the image data is convoluted to enhance portions of the image representing edges of the object 12.

The resulting image is then store in a database 112, from the basis of which a three-dimensional or perspective representation of the object 12 may be presented on the display 110.

Embodiments of the present invention thus provide the advantage of generating a three-dimensional or perspective representation of the object 12, by virtue of the detectors being positioned at different angles depending on their location in relation to the source emission, and of enhancing detection capabilities, thereby allowing for an operator to better analyze the object 12.

Further advantageously, such a three-dimensional or perspective representation may provide more a revealing image of the object 12 when compared to two-dimensional images generated by traditional scanners. More specifically, such a representation may allow a user to visualize more walls or boundaries of the object 12, and may have fewer "dark spots" corresponding to parts of the object 12 which have planes aligned with the plane of the EM radiation emitted by the source.

It is to be understood that, in accordance with alternate embodiments, the above-described system and method may be adapted to operate with a single energy level of X-Ray signal captured at the detectors, as well as a plurality, i.e. two or more of such energy levels of X-Ray signal (instead of only low energy and high energy, as in the context of the above-described embodiments). Indeed, any suitable ranges of energy levels may be defined and captured by the detectors and further processed, for example to obtain more information on the composition of the object being scanned.

Of course, numerous other modifications could be made to the above-described embodiments without departing from the scope of the invention, as defined in the appended claims.

The invention claimed is:

1. A scanning system for scanning an object comprising:
a scanning chamber having opposed side surfaces and a third surface extending between the side surfaces;
a displacement assembly engageable with the scanning chamber, the displacement assembly configured for receiving the object and displacing the object in a displacement direction into the scanning chamber;
a bracket frame mounted to the scanning chamber and inclined relative to a horizontal in the displacement direction;
a source mounted to an inclined support and in fixed position about the scanning chamber for emitting electromagnetic radiation toward the bracket frame at an angle inclined relative to the horizontal and against the object in the scanning chamber so that the electromagnetic radiation impacts and passes through the object; and
a plurality of detectors mounted to the bracket frame at least partially about the scanning chamber, each detector being inclined at a detector angle, the detector angle of at least one of the detectors having a different value than the detector angle of an adjacent detector, each detector configured for detecting the electromagnetic radiation passed through the object, thereby scanning the object.

2. A scanning system according to claim 1, wherein the source is configured for emitting electromagnetic radiation from a focal point as a beam having beam boundaries, the beam boundaries being separated by an angular interval of about 80°.

3. A scanning system according to claim 2, wherein one of the beam boundaries is aligned with one of the side surfaces of the scanning chamber.

4. A scanning system according to claim 2, wherein each detector has a detector card having a centre point and edges.

5. A scanning system according to claim 4, wherein each detector is inclined at a corresponding detector angle such that the centre point of each detector card is substantially perpendicular to the focal point.

6. A scanning system according to claim 4, wherein each detector card is inclined at a corresponding detector angle such that the edges of each detector card engage at least one of the third surface and the side surfaces of the scanning chamber.

7. A scanning system according to claim 1, wherein the plurality of detectors comprise two rows of detectors mounted to the frame, the first row of detectors being disposed adjacent to one of the side surfaces of the scanning chamber, and the second row of detectors being disposed adjacent to the third surface of the scanning chamber.

8. A bracket for a scanning system for scanning an object, comprising:
a bracket frame mountable to the scanning system, the bracket frame being inclined relative to a horizontal;
a source mounted to an inclined support and in fixed position for emitting electromagnetic radiation toward the bracket frame at an angle inclined relative to the horizontal and against the object so that the electromagnetic radiation impacts and passes through the object, the source being mounted to the bracket frame; and
a plurality of detectors mounted to the bracket frame, each detector being inclined at a detector angle, the detector angle of at least one of the detectors having a different value than the detector angle of an adjacent detector, each detector configured for detecting the electromagnetic radiation passed through the object, thereby scanning the object.

9. A bracket according to claim 8, wherein the bracket frame forms an angle relative to the horizontal between about 1° and about 45°.

10. A bracket according to claim 9, the bracket frame forms an angle relative to the horizontal between about 10° and about 20°.

11. A bracket according to claim 8, wherein the source is configured for emitting electromagnetic radiation from a focal point as a beam having beam boundaries, the beam boundaries being separated by an angular interval of about 80°.

12. A bracket according to claim 11, wherein each detector has a detector card having a centre point and edges.

13. A bracket according to claim 12, wherein each detector is inclined at a corresponding detector angle such that the centre point of each detector card is substantially perpendicular to the focal point.

14. A method of generating a three-dimensional image of a scanned object, comprising the steps:
receiving, at an input port, image data of an object, having been captured via a plurality of detectors disposed at least partially about the object and mounted to a bracket frame inclined relative to a horizontal, at least two adjacent ones of the detectors being angled one with respect to the other, each of the detectors receiving electromagnetic radiation emitted by a source at an angle inclined relative to the horizontal toward the bracket frame and passing through the object, the source mounted to an inclined support and in fixed position;
by means of a processor, generating from the image data, an image representing a perspective view of the object; and
storing said image into a storage for presenting on a display, a three dimensional representation of the object.

15. The method according to claim 14, wherein the generating comprises juxtaposing into a row, the image data received from adjacent detectors.

16. The method according to claim 15, wherein the image data received comprises image captures of segments of the object, and wherein the juxtaposing of the generating step is repeated for each one of the segments, the generating step further comprising concatenating the rows.

17. The method according to claim 14, further comprising normalizing the image of the object, by means of a normalizing module integrated in the processor.

18. The method according to claim 17, wherein the normalizing comprises at least one of:
correcting an offset for a given pixel of the image data in relation to an offset reference, and
correcting a gain for a given pixel of the image data in relation to a gam reference.

19. The method according to claim 14, wherein the image data of the receiving step, comprises low energy absorption data and high energy absorption data for one or more pixel of the image data.

20. The method according to claim 19, further comprising fusing the low energy absorption data and high energy absorption data for one or more pixel of the image of the object, by means of a fusion module integrated in the processor.

21. The method according to claim 19, further comprising calculating, by means of a calculator integrated in the processor, an atomic number for one or more pixel of the image data.

22. The method according to claim 21, wherein the calculating comprises for each pixel:
receiving said low energy absorption data and high energy absorption data; receiving a signal level of a source emission detected by the detectors; and referencing, via reference data stored in the storage, an atomic number to the combination of the low energy absorption data, the high energy absorption data and
the signal level of the source emission.

23. A data storage comprising data and instructions for execution by a processor to generate a three-dimensional image of a scanned object, said data and instructions comprising:
code means for receiving image data of an object, having been captured via a plurality of detectors disposed at least partially about the object and mounted to a bracket frame inclined relative to a horizontal, at least two adjacent ones of the detectors being angled one with respect to the other, each of the detectors receiving electromagnetic radiation emitted by a source at an angle inclined relative to the horizontal toward the bracket frame and passing through the object, the source mounted to an inclined support and in fixed position;
code means for generating from the image data, an image representing a perspective view of the object; and
code means for storing said image into a storage for presenting on a display, a three-dimensional representation of the object.

24. A system for generating a three-dimensional image of a scanned object, comprising:
an input port for receiving image data of an object, having been captured via a plurality of detectors disposed at least partially about the object and mounted to a bracket frame inclined relative to a horizontal and in an angled configuration, wherein at least two adjacent ones of the detectors are angled one with respect to the other, each of the detectors receiving electromagnetic radiation emitted by a source at an angle inclined relative to the horizontal toward the bracket frame and passing through the object, the source mounted to an inclined support and in fixed position;
a processor for generating from the image data, an image representing a perspective view of the object; and
a storage for presenting the image on a display as a three-dimensional representation of the object.

25. A scanning system for scanning an object, comprising:
a radiation source mounted to an inclined support and in fixed position for emitting electromagnetic radiation at an angle inclined relative to a horizontal, toward an object to be scanned, and toward a bracket frame inclined relative to a horizontal; and
a plurality of detectors mounted to the bracket frame and disposed at least partially about a scanning area, each detector being mounted substantially perpendicularly in relation to the radiation source for capturing the radiation traversing the object from different angles and thereby scanning the object according to a perspective view.

* * * * *